(12) United States Patent
Meyerson et al.

(10) Patent No.: US 6,912,283 B2
(45) Date of Patent: Jun. 28, 2005

(54) TELEDATA SPACE AND DOCKING STATION WITH MODULAR AND INTEGRATED DISPLAY

(76) Inventors: Robert F. Meyerson, 2180 Immokalee Rd. Suite 311, Naples, FL (US) 34110; Rodney A. Ross, 3076 Ridgewood Rd., Fairlawn, OH (US) 44333; Calvin E. Lewis, 3760 Fairway Park Dr., Suite 206, Copley, OH (US) 44321

(*) Notice: Subject to any disclaimer, the term of this patent is extended or adjusted under 35 U.S.C. 154(b) by 638 days.

(21) Appl. No.: 09/961,532

(22) Filed: Sep. 24, 2001

(65) Prior Publication Data

US 2003/0059038 A1 Mar. 27, 2003

(51) Int. Cl.[7] .................................................. H04M 1/00
(52) U.S. Cl. ............................. 379/428.04; 379/428.03
(58) Field of Search ....................... 379/428.04, 420.04, 379/428.03, 433.04, 88.11

(56) References Cited

U.S. PATENT DOCUMENTS

| | | | |
|---|---|---|---|
| 4,817,127 A | * | 3/1989 | Chamberlin et al. ..... 379/88.11 |
| 5,655,015 A | | 8/1997 | Walsh et al. |
| D389,146 S | | 1/1998 | Tan |
| 6,188,677 B1 | | 2/2001 | Oyama et al. |
| 6,240,168 B1 | | 5/2001 | Stanford et al. |
| 6,330,244 B1 | | 12/2001 | Swartz et al. |
| 6,366,653 B1 | | 4/2002 | Yeh et al. |
| 6,389,005 B1 | | 5/2002 | Cruickshank |
| 6,396,907 B1 | | 5/2002 | Didcock |
| 6,424,711 B1 | | 7/2002 | Bayless et al. |
| 6,429,855 B2 | | 8/2002 | Pabon et al. |
| 2002/0085535 A1 | | 7/2002 | Williams |
| 2002/0086702 A1 | | 7/2002 | Dimenstein et al. |

OTHER PUBLICATIONS

Symbol Technologies, Press Release, Symbol Announces Wireless LAN Telephone System. Jan. 19, 1998.

* cited by examiner

Primary Examiner—Jack Chiang
(74) Attorney, Agent, or Firm—Timothy P. OHagan

(57) ABSTRACT

A desk top telephone includes a network interface circuit for audio session set up and audio session communication with a remote telephone device. A display device docking bay accommodates a simple display screen or a portable computing device such as a portable data device (PDA). Each of a plurality of adapters coupled one of the modular display screens or a PDA to the docking bay. Each of the module display screens and PDAs can have various display sizes, resolutions, and color/gray-scale combinations.

19 Claims, 9 Drawing Sheets

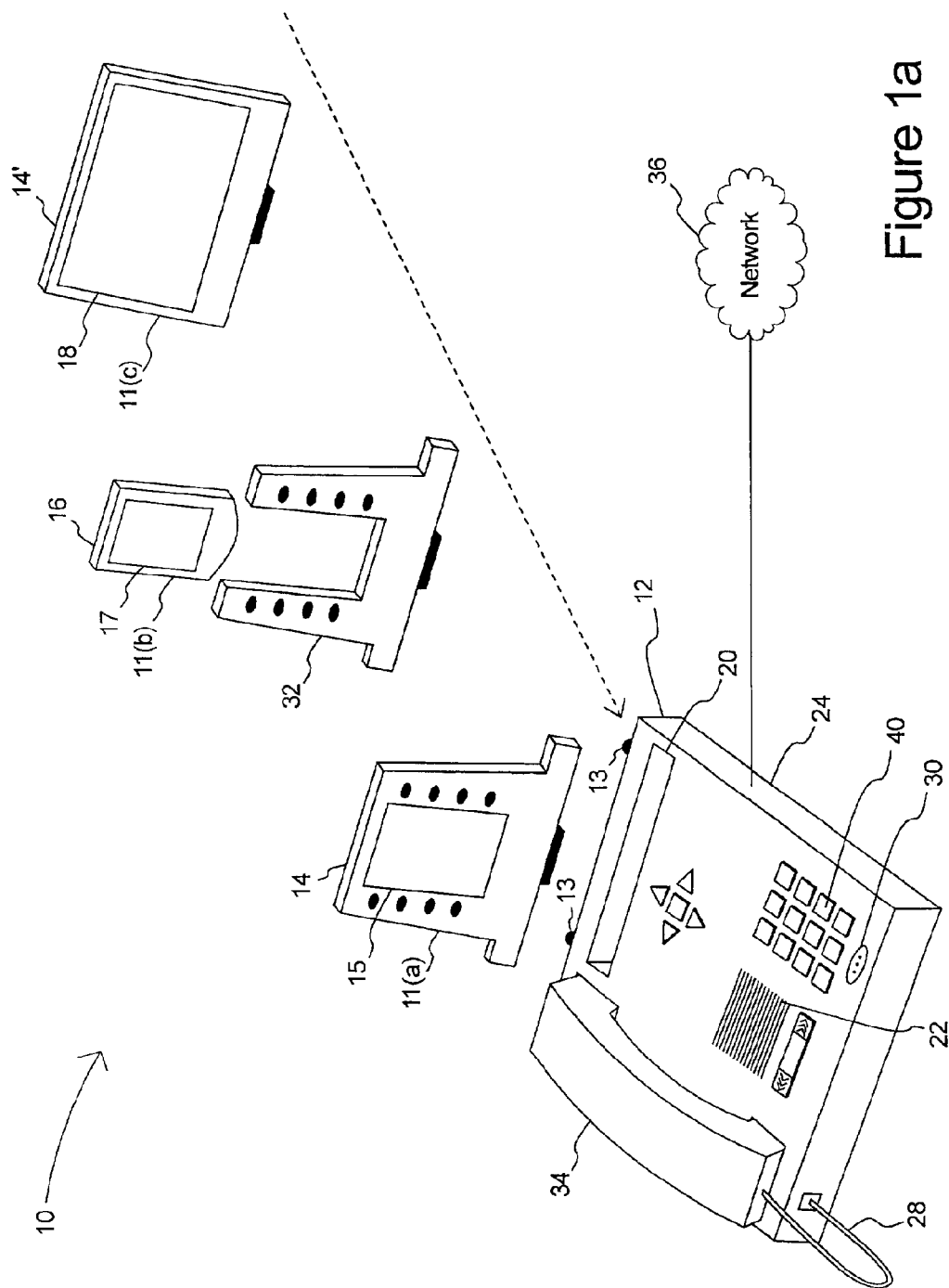

TELEDATA SPACE AND DOCKING STATION WITH MODULAR AND INTEGRATED DISPLAY

TECHNICAL FIELD

The present invention relates generally to a desk top telephone device, and more particularly to a configurable desk top telephone device with a docking bay and modular display devices.

BACKGROUND OF THE INVENTION

For many years, the desk top telephone device has been the terminating device of a plain old telephone service (POTS) subscriber loop. More specifically, the tip and ring lines from the telephone service provider (Telco) would couple directly to the telephone device. The telephone device would function to modulate dual-tone-multi-frequency (DTMF) dialing signals (Prior to DTMF, modulate rotary pulse dialing signals) onto the subscriber loop for initiating a telephone call to another station and would receive ring signals from the subscriber loop for alerting an operator of an incoming call. During a telephone conversation the device would both receive modulated voice signals for driving the device handset speaker and modulate the operator's voice signals from the device handset microphone. On the basic telephone device, the user interface includes the handset speaker and microphone and the numeric keypad for generating the DTMF signals.

In addition to operating a telephone directly connected to a POTS subscriber loop, telephone switching technology has enabled businesses to install proprietary telephone systems which include a separate extension for each employee. A typical system will include a central switch and a proprietary "subscriber loop" interconnecting the central switch to each employees telephone device which is often called an "extension". For initiating calls to, and terminating calls from, the local Telco, a plurality of trunk lines couple the central switch to the local Telco switching station.

More recently the proprietary subscriber loop has been replaced with a TCP/IP compliant data network for a telephone system commonly referred to as a Voice-over-IP system.

As telephone switching technology advanced, additional functionality has been added to the telephone. For example, services such as caller ID, call forwarding, call transferring, conference calling, have been added to both proprietary systems and Telco phone service. To accommodate this additional functionality, small liquid crystal display screens have been added to many phones.

A problem associated with adding such display screens to telephones is that the small size, lack of addressable pixel resolution (many are seven segment and fixed symbol displays), and lack of gray scale (many are binary) do not provide the flexibility for providing an enhanced user interface and increased the cost of the telephone.

What is needed is a telephone system with display screen flexibility that does not suffer the disadvantages of the present systems.

SUMMARY OF THE INVENTION

A first aspect of the present invention is to provide a telephone with network interface circuit for setting up audio sessions and communicating audio data during an audio session with a remote telephone system over a network. The telephone network may be an analog plain old telephone service (POTS) network, a circuit switched digital telephone network, or a packet switched telephone/data network. An audio sub-system receives a microphone input representing the voice of an operator and presents audio data to the network interface circuit receives audio data from the network interface circuit and generates a signal for driving a speaker. A display docking bay is configured for supporting and operatively coupling a modular display device to the telephone. The modular display device may be either a simple display device or a portable computing device. The portable computing device may be a commercially available device known as a portable data assistant (PDA).

The information related to operation of the telephone may include a data file of tagged data elements and may include a style sheet for defining the aesthetic display of the tagged data elements on the display on the portable computing device.

The telephone may further include a communication controller coupled to the display docking bay for coupling information related to operation of the telephone to a portable computing device if a portable computing device is operatively coupled to and/or supported in the docking bay. And, may include a display controller coupled to the display docking bay for coupling a video signal to a simple display device if a simple display device is operatively coupled to and/or supported in the docking bay.

The telephone may further yet include a device detection circuit coupled to the docking bay for identifying whether the modular display device coupled to the docking bay is a portable computing device or a simple display device.

The telephone may also include a power supply circuit for coupling operating power and/or charging power to the docking bay whereby the modular display device may operate and/or charge using the power coupled to the docking bay when operatively coupled to and/or supported in the docking bay.

A second aspect of the present invention is to provide a desk top telephone system comprising a base telephone unit with a network interface circuit for audio session set-up, and audio session communication with a remote telephone system and a display docking bay. The system also comprises: a) a simple display module configured for coupling to the display docking bay, receiving a video signal from the base telephone unit, and generating a display on a display screen in accordance with the video signal; and b) a portable computing device configured for coupling to the display docking bay, receiving information related to operation of the base telephone unit and displaying the information related to operation of the base telephone unit on the display screen.

The information related to operation of the base telephone unit may include a data file of tagged data elements and may include a style sheet for defining the aesthetic display of the tagged data elements on the display on the portable computing device.

The base telephone unit may further include a communication controller coupled to the display docking bay for coupling information related to operation of the base telephone unit to a portable computing device if a portable computing device is operatively coupled to and/or supported in the docking bay. And, may include a display controller coupled to the display docking bay for coupling a video signal to a simple display device if a simple display device is operatively coupled to and/or supported in the docking bay.

The base telephone unit may further yet include a device detection circuit coupled to the docking bay for identifying whether the modular display device coupled to the docking bay is a portable computing device or a simple display device.

The base telephone unit further yet may include a power supply circuit for coupling operating power and/or charging power to the docking bay whereby the modular display device may operate and/or charge using the power coupled to the docking bay when coupled to the docking bay.

A third aspect of the present invention is to provide a desk top telephone system comprising a base telephone unit. The base telephone unit includes a) a network interface circuit for audio session set-up, and audio session communication with a remote telephone system; b) a display docking bay; and c) a display control system for coupling both a video signal representing the content of a display screen and information related to operation of the base telephone unit to the display docking bay. The telephone system further includes a plurality of docking bay adapters, each configured to operatively couple and/or support one of a plurality of modular display devices in the display docking bay. The modular display devices include both simple display modules operative for displaying information in accordance with the video signal and portable computing modules operative for displaying information in accordance with the information related to operation of the base telephone unit.

The information related to operation of the base telephone unit may include a data file of tagged data elements and may include a style sheet for defining the aesthetic display of the tagged data elements on the display on the portable computing device.

The base telephone unit further yet may include a power supply circuit for coupling operating power and/or charging power to the docking bay whereby the modular display device may operate and/or charge using the power coupled to the docking bay when operatively coupled to and/or supported in the docking bay.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 1(a) is a perspective view of a desk top telephone system in accordance with one embodiment of this invention;

DESCRIPTION OF THE PREFERRED EMBODIMENTS

Figure 1B:
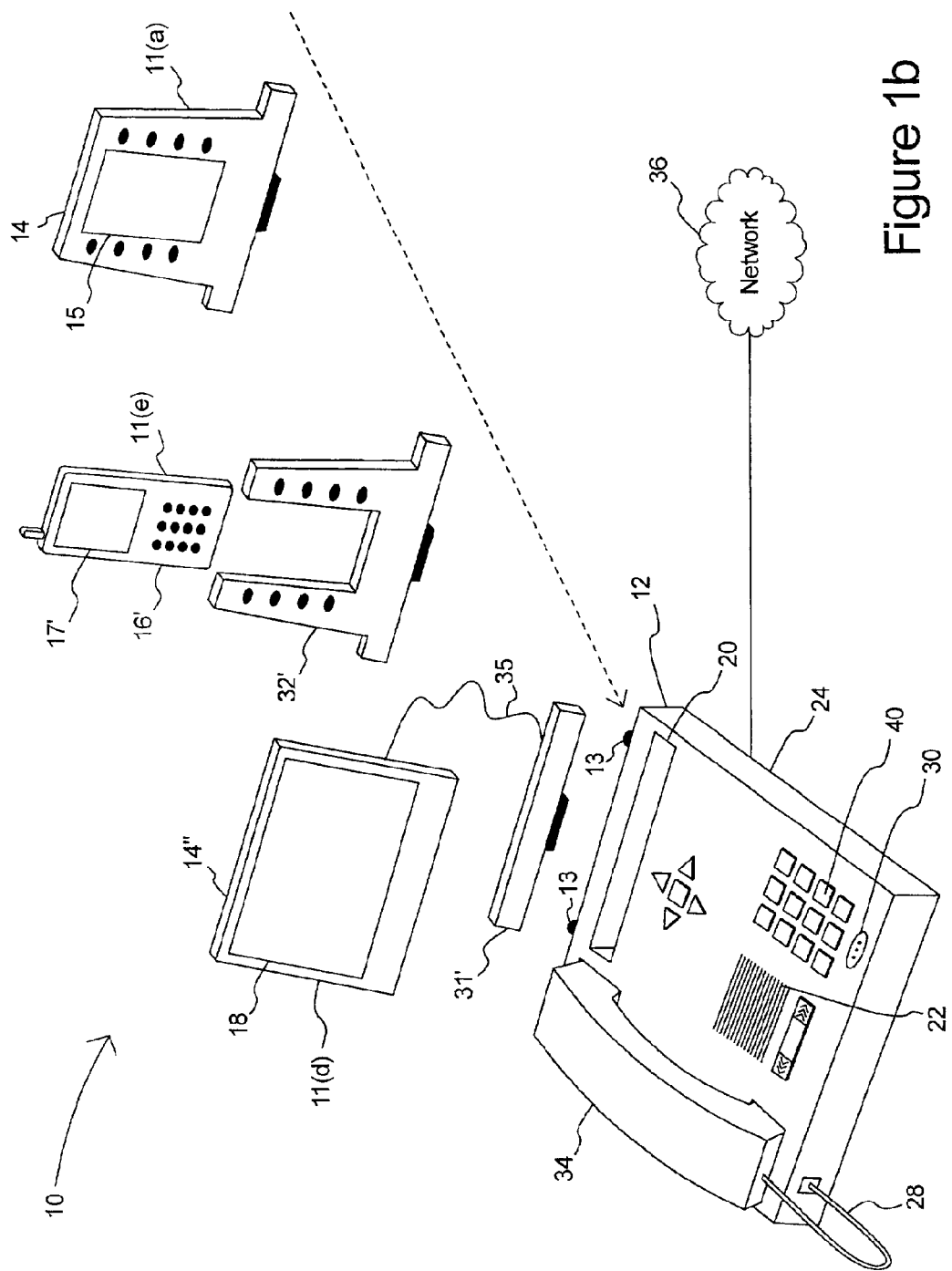
FIG. 1(b) is a perspective view of an alternative desk top telephone system in accordance with one embodiment of this invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings. A reference number followed by a "prime" symbol or a "double-prime" symbol represent an element that is a species embodiment of the more generic element designated by the reference number without a "prime" or "double-prime" designation.

It should also be appreciated that many of the elements discussed in this specification may be implemented in hardware circuit, a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Referring to FIGS. 1(a) and 1(b), a perspective view of a desk top telephone system 10 in accordance with this invention is shown. The desk top telephone system 10 includes a base telephone unit 12 and a plurality of modular display devices 11(a), 11(b), 11(c), 11(d), and 11(e) operating in conjunction with the base telephone unit 12. Each of the modular display devices 11(a), 11(b), 11(c), 11(d), and 11(e) may be configured to couple to a display docking bay 20 on a base housing 24 of the base telephone unit 12 and to display information related to operation of the base telephone unit 12 under the control of the base telephone unit 12. The modular display device may be secured in the display docking bay 20 by a mechanical locking mechanism such as a pair of quarter-turn screws 13.

The modular display device 11(a) may be a simple display device 14 with a liquid crystal display 15 (either binary, grayscale, or color) and configured to couple directly into the display docking bay 20. The content of the display 15 on the simple display device 14 may be driven by a video signal coupled from the base telephone unit 12 to the simple display device 14 via the display docking bay 20. The display docking bay 20 supports the simple display device 14 in a configuration wherein the display may be visible to an operator of the base telephone unit 12 when coupled to the display docking bay 20.

The modular display device 11(b) may be a portable computing device such as one of the commercially available devices known as a personal data assistant (PDA) 16. Throughout this specification, the term PDA 16 may be used to indicate a the portable computing device 16. Because there exist many configurations of PDA's currently available and because each PDA may be both mechanically and electrically configured to couple to a proprietary docking station, an adapter 32 may be configured to mechanically and electrically interface the PDA 16 to the display docking bay 20. It is envisioned that a commercial embodiment of the desktop telephone system 10 would provide for an adapter 32 configured for each commonly available PDA. The content of a liquid crystal display 17 on the PDA 16 may be controlled by the base telephone unit 12. The base telephone unit 12 passes a plurality of data files containing information related to operation of the base telephone unit 12 to the PDA 16 and display circuits within the PDA 16 generate appropriate internal video signals for driving the display 17 on the PDA 16. The data files may comprise a plurality of tagged data elements (e.g. XML Schema) and style sheets (setting forth the aesthetic contents of the display) using a language such as Extensible Mark-up Language (XML). Again, the display docking bay 20 supports the PDA 16 in a configuration wherein the display 17 may be visible to an operator of the base telephone unit 12 when the PDA 16 may be coupled to the display docking bay 20.

The modular display device 11(c) may be a simple display device 14' with a high resolution full size graphic liquid crystal display 18 with advanced color depth and resolution. The simple display device 14' may be referred to a graphic display device 14' throughout this specification. The contents of the graphic display device 14' may be driven by a high resolution video signal such as VGA, SVGA, or XVGA provided by the base telephone unit 12 and coupled to the graphic display device 14' via the display docking bay 20.

Referring briefly to FIG. 1(b), the modular display device 11(d) may be a detached graphic display device 14" may be configured to stand on a desk next to the base telephone unit 12 or hang on a wall near the base telephone unit 12 for easy viewing by the operator. The detached graphic display device 14" may be coupled to the base telephone unit 12 by a cable 35 and an adapter 31' which secures to the display docking bay 20. Similar to the graphic display device 14', the graphic display device 14" may be driven by a high resolution video signal provided by the base telephone unit 12.

The modular display device 11(e) may be a cellular telephone 16' with embedded PDA capabilities and a PDA sized graphic display 17'. Similar to the PDA 16, the cellular telephone 16' may coupled to the docking bay 20 utilizing an adapter 32' configured to the specific mechanical and electrical capabilities of the cellular telephone 16'. Also similar to the PDA 16, the content of the PDA sized graphic display 17' may be controlled by the base telephone unit 12. The base telephone unit 12 may pass a plurality of data files containing information related to operation of the base telephone unit 12 to the cellular telephone 16' and display circuits within the cellular telephone 16' may generate appropriate internal video signals for driving the display 17'. Again, the data files may comprise a plurality of tagged data elements and style sheets using a language such as XML.

The base telephone unit 12 may further include a handset 34. The handset 34 may include a speaker and microphone for operation by the operator when conversing with an operator of a remote telephone system and the handset 34 may cradle to the base housing 24 when not in use. The handset 34 may be coupled to the base housing 24 using a cable 28 or using a wireless radio system internal within the handset housing 34 and the base housing 24. In the embodiment with the wireless radio, the handset will include a battery power supply which may be charged by a power source in the base housing 24 when cradled. The base housing 24 may also include a microphone 30 and a speaker 22 for operation of the base telephone unit 12 as a "speaker phone". A numeric keypad 40 on the top surface of the base housing 24 enables an operator to dial the base telephone unit 12. More specifically, in response to operator input through the numeric keypad 40, the base telephone unit 12 operates to set-up an audio session with a remote telephone system (not shown) utilizing an appropriate call signaling protocol and operates to generate DTMF scratch pad signals for the operator.

To enable the operator of the base telephone unit 12 to converse with an operator of the remote telephone system during an audio session, the base telephone unit 12 includes a network interface circuit (FIG. 2) within the housing 24 which operates for audio session set up and audio session communication with the remote telephone system. More specifically, the network interface circuit may: i) receive a signal from the microphone 30 (or the microphone in the handset) and generate a digital signal (which may be compressed) for transmission across a network 36; and ii) receive a digital signal from the network and generate a signal for driving the speaker 22 (or the speaker in the handset).

It is envisioned that the network 36 may be: i) a circuit switched plain old telephone system (POTS) network provided by a local telephone service provider public telephone system; ii) a circuit switched digital telephone system such as those commonly available for business telephone systems; iii) a packet switched telephone/data network such as a TCP/IP compliant Ethernet network, or iv) any other network using RF, optical fiber, twisted cable, or coaxial cable as the physical medium.

Figure 2:
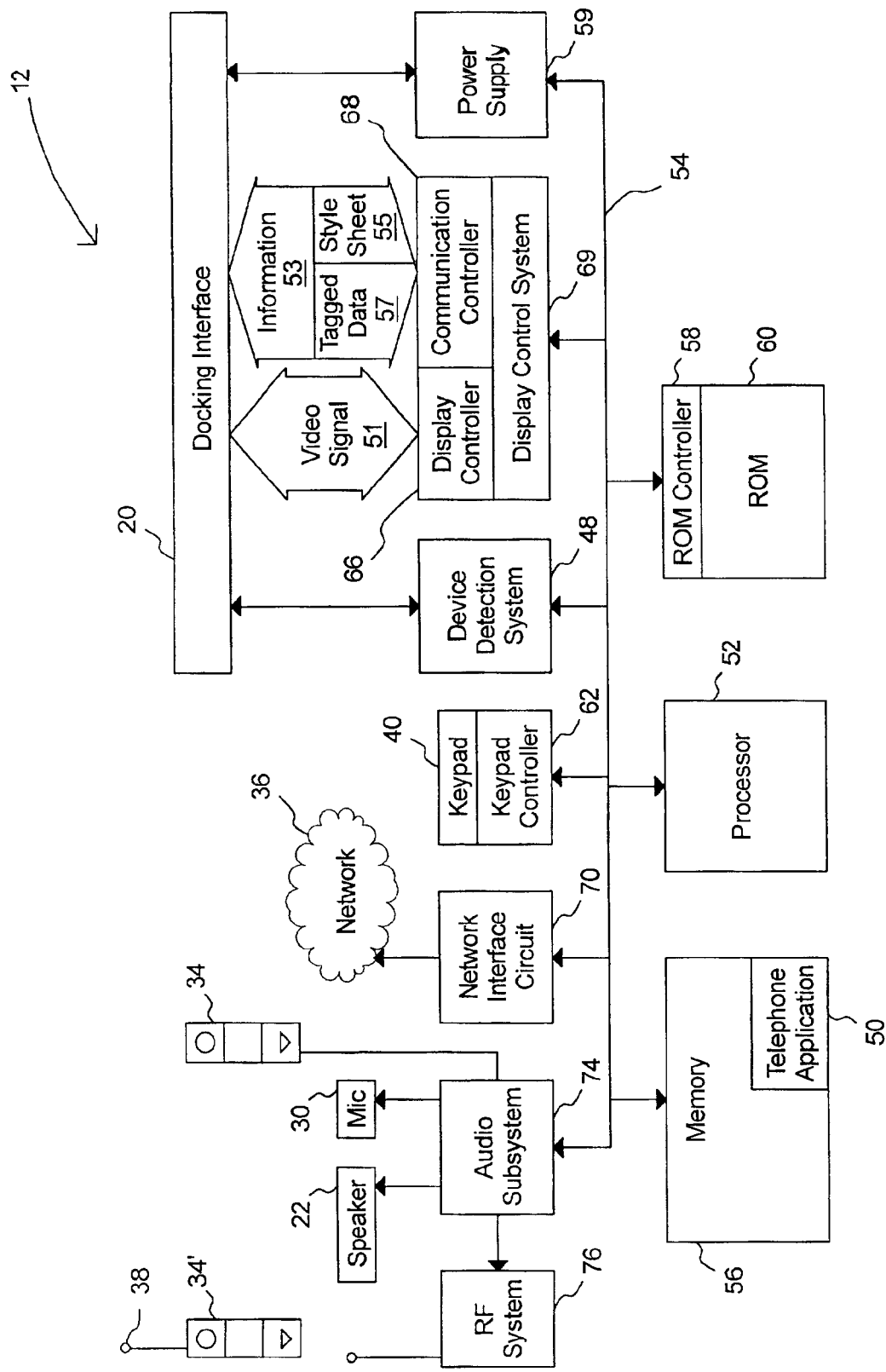
FIG. 2 is a block diagram of a base telephone unit in accordance with one embodiment of this invention.

Turning to FIG. 2, a block diagram of the base telephone unit 12 is shown. The basic architecture of the base telephone unit 12 includes a processor 52 coupled to a local bus 54 which interconnects the processor 52 with both RAM memory 56 and a plurality of peripheral controllers which include a ROM memory controller 58, a keypad controller 62, a display control system 69, a network interface circuit 70, an audio sub-system 74, and an RF system 76.

A ROM memory 60 stores software for operation of the base telephone unit 12 which may include an operating system, a telephone application program 50 (which will be discussed in more detail herein), and drivers for each of the peripheral controllers. Upon boot up of the base telephone unit 12, executable code may be copied into the RAM memory 56 and the processor 52 executes from the RAM memory 56.

The network interface circuit 70 in conjunction with an appropriate telephone application 50 and drivers executed by the processor 52, operates to set up audio session and perform audio session communication of audio data with a remote telephone system (not shown) over the network 36.

Figure 3:
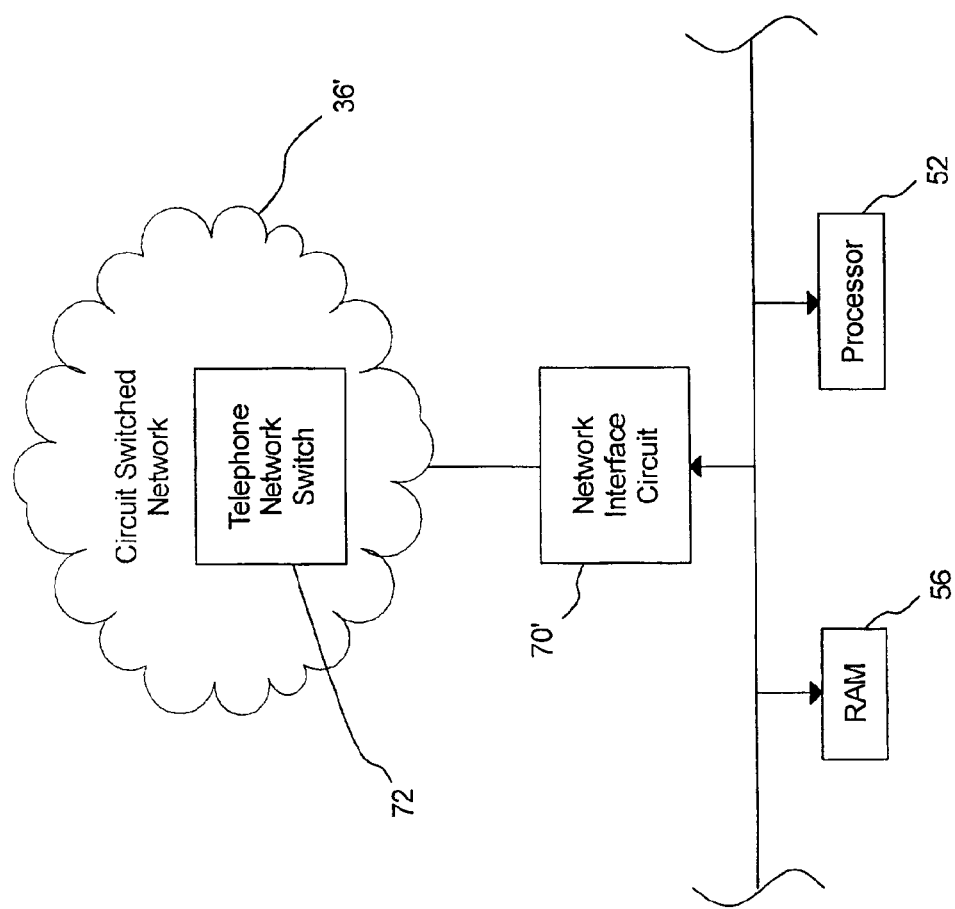
FIG. 3 is an partial block diagram of an embodiment of the base telephone unit of FIG. 2 useful in a circuit switched telephone network.

Referring briefly to FIG. 3, the network 36 of FIG. 2 may include a circuit switched telephone network 36'. In such embodiment, the network interface circuit 70' operates to set up audio sessions (e.g. telephone calls), using appropriate network protocols, and to both send and receive analog or digital audio signals during the audio session to and from a telephone network switch 72 which forms a part of the circuit switched telephone network system 36'.

Figure 4:
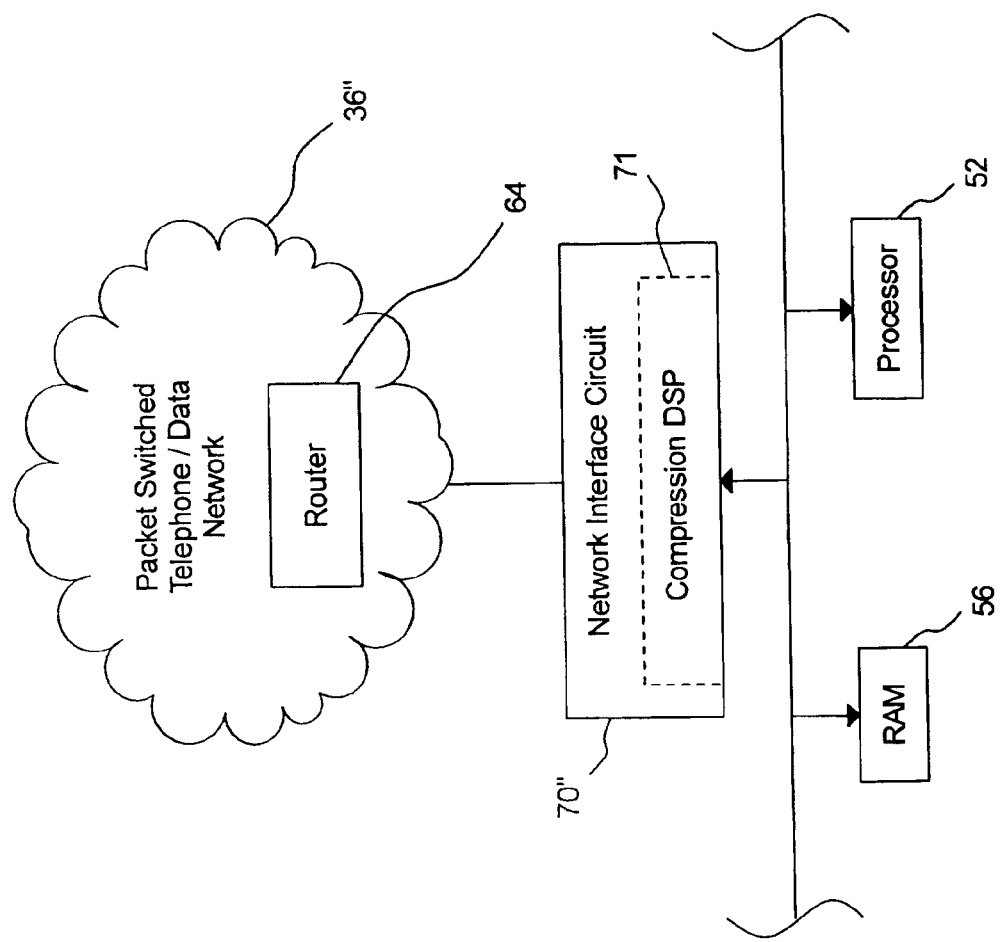
FIG. 4 is a partial block diagram of an embodiment of the base telephone unit of FIG. 2 useful in a packet switched telephone/data network.

Referring briefly to FIG. 4, the network 36 of FIG. 2 may include a packet switched telephone/data network 36". In such embodiment, the network interface circuit 70" includes appropriate DSP circuits 71 (e.g. CODEC) for compressing and decompressing digital audio data for transmission in UDP data packets to a remote telephone device via a router 64. The network interface circuit 70" and the processor 52 executing appropriate software provides for operating appropriate TCP/IP stacks, media access layer and physical layer communication of data over the packet switched telephone data network 36".

Returning again to FIG. 2, the audio sub system 74 operates to receive a microphone signal from the microphone 30, the handset 34', or the wireless handset 34" (through the RF system 76) and to generate a digital audio signal within appropriate dynamic range parameters. The digital audio signal may be written directly into the RAM memory 56 using DMA systems where it can be retrieved by the telephone application 50 and/or the network interface circuit 70 for transmission to the remote telephone device on the network 36. At the same time, the audio subsystem 74 may also retrieve audio data from the RAM memory 56 (that was written to the memory by the system interface circuit 70 or the telephone application 50) and generate an analog signal for driving the speaker 22, the handset 34' or the wireless handset 34".

The keypad controller 62 functions in a typical manner to detect key pad 40 input by the operator and generate an appropriate interrupt such that the telephone application 50 may set up an appropriate audio session with a remote telephone device via the network 36 and may generate DTMF scratch pad tones for the operator in accordance with a telephone number to the remote telephone system dialed by the operator.

The display control system 69 couples both a video signal 51 and data files representing information 53 related to operation of the base telephone unit 12 to the display docking bay 20. The display control system 69 includes a display controller 66 which operates in a conventional matter for generating an appropriate video signal for driving an LCD display screen. The application 50 may write a gray scale value or color depth value for each pixel to predefined memory space and the display controller 66 will scan the predefined memory space and generate the video signal 51 representing the virtual display within the memory space. The video signal 51 may comply with the VGA, SVGA, XVGA, or other public or proprietary video signal standards. The video signal 51 generated by the display controller 66 may be coupled to the display docking bay 20 whereby it may be received by a simple display device 14 (FIG. 1) if a simple display device 14 is coupled to and/or supported in the display docking bay 20.

The display control system 69 also includes a communication controller 68 that may be a conventional serial communication controller for transferring data to and from another computing device with a compatible serial communication controller. The serial communication controller 68 may be coupled to the display docking bay 20 and operates to coupled information 53 related to operation of the base telephone unit 12 to a PDA 16 if a PDA 16 is coupled to and/or supported in the display docking bay 20. As discussed previously, the information 53 related to operation of the base telephone unit 12 may include tagged data elements 57 (wherein each data element includes a tag identifying the significance of the data) and style sheets 55 setting forth the aesthetic display of the data elements 57 on the display screen of the PDA 16.

Figure 8:
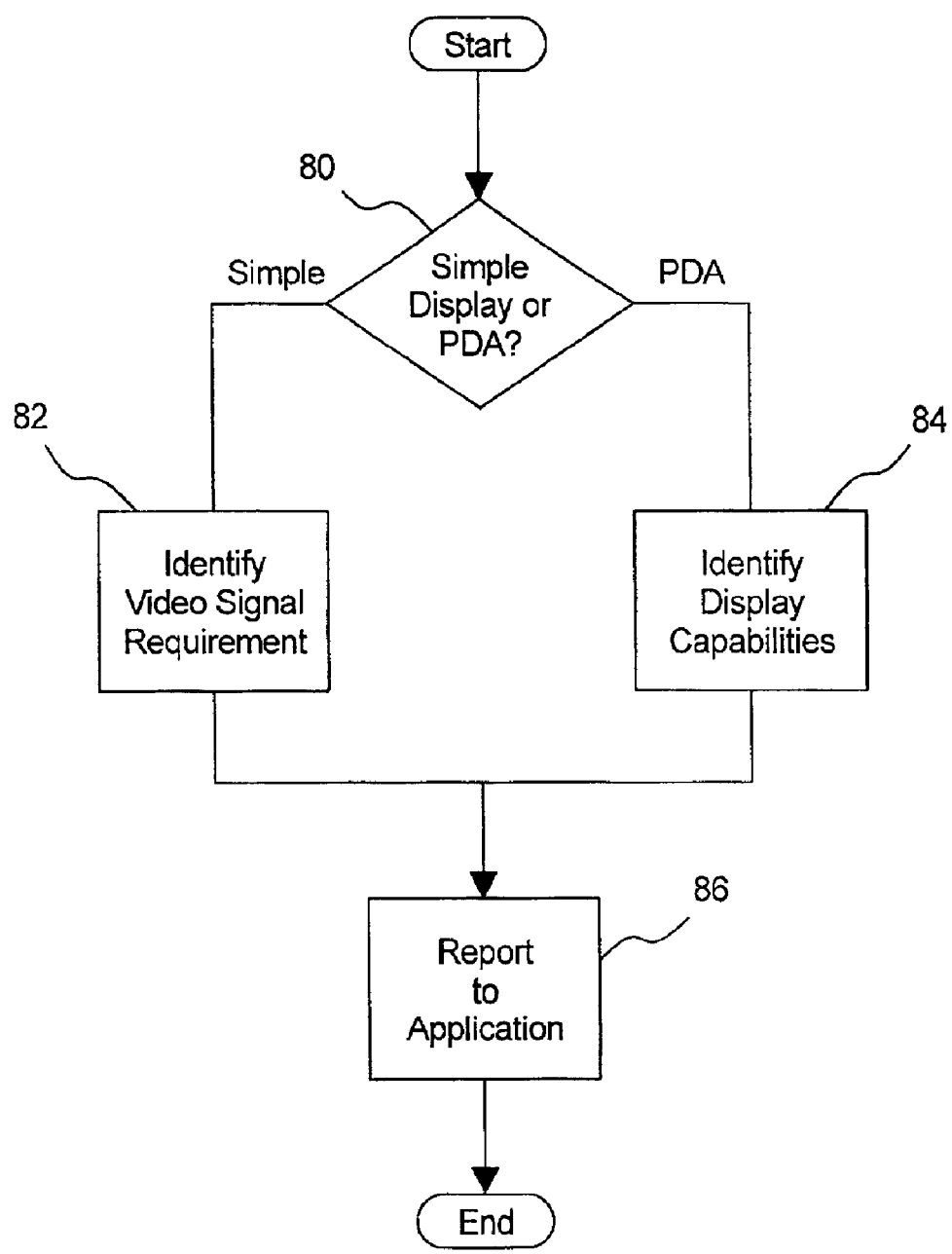
FIG. 8 is a flow chart of exemplary operation of a device detection circuit.

The device detection system 48 may also be coupled to the display docking bay 20 and functions to detect and identify which of the embodiments of the modular display device 11 (FIG. 1) is coupled to the display docking bay 20. More specifically, referring to the flow chart of FIG. 8 in conjunction with FIG. 2, the device detection system 48 will identify whether a modular display device is a simple display device or a PDA 16 at step 80. If the modular display device is a simple display device, the video signal requirements for the specific embodiment of the simple display device will be identified at step 82. (e.g. VGA signal, SVGA signal, ect). Alternatively, if the modular display device is a PDA, the display capabilities of the PDA will be identified at step 84 such that an appropriate style sheet may be selected for display of the tagged data elements on the identified PDA. Step 86 represents reporting the video signal requirements and/or the display capabilities to the telephone application 50 which utilizes such to select and/or provide for an appropriate video signal to be generated by the display controller 66 or an appropriate style sheet 55 passed by the communication controller 68. Alternatively, step 86 may represent providing identifying information about a particular modular display device coupled to the display docking bay 20 such that an appropriate video signal 51 and/or style sheet 55 may be selected by the base telephone unit 12.

Figure 5:
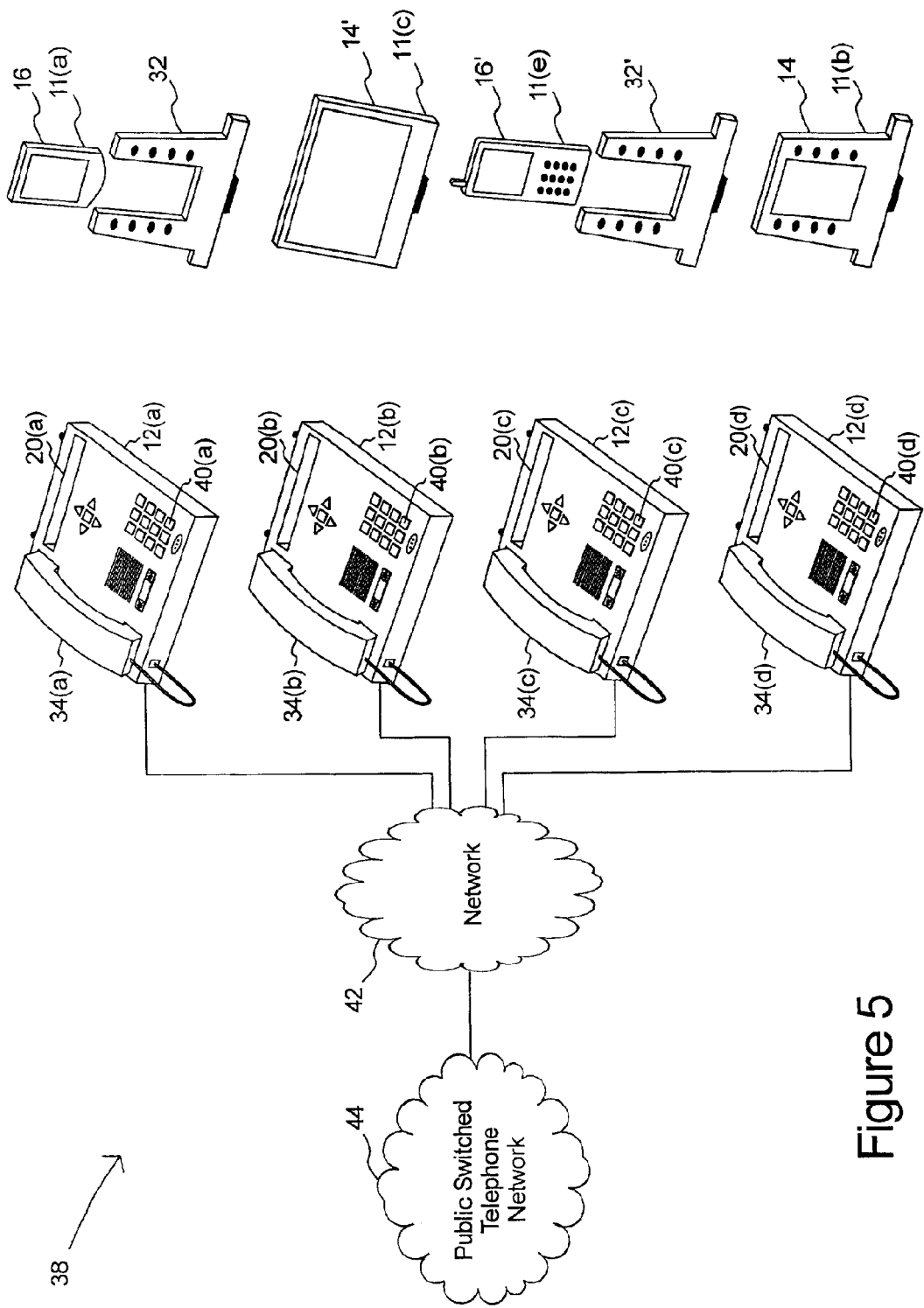
FIG. 5 is a block diagram of a telephone network utilizing the telephone system of FIG. 1.

Referring to FIG. 5, a block diagram of a private telephone system 38 is shown. The private telephone system 38 includes a plurality of base telephone units 12(a)–12(d) each of which may be configured similar to the base telephone unit 12 as discussed with respect to FIGS. 1 through 4. Each base telephone unit 12(a)–12(d) may be coupled to a network 42.

Each base telephone unit 12(a)–12(d) includes a display docking bay 20 into which may be inserted a modular display device 11(a)–11(e) as described with referenced to FIGS. 1(a) and 1(b) utilizing an adapter 32 if appropriate.

The network 42, in addition to being coupled to each base telephone unit 12(a)–12(d) may also coupled to a public switched telephone network (PSTN) 44 and provides a gateway such that each base telephone unit 12(a)–12(d) may both place and receive telephone calls with other base telephone units 12(a)–12(d) coupled to the network 42 and with remote telephone system (not shown) coupled to the PSTN 44.

As discussed previously, the present invention is applicable to all networks including traditional circuit switched telephone network systems (typically referred to as a "switch" or a "key switch" system) and is applicable to packet switched telephone/data network systems (typically referred to as a "voice-over-IP" or "VOIP" system).

Figure 6:
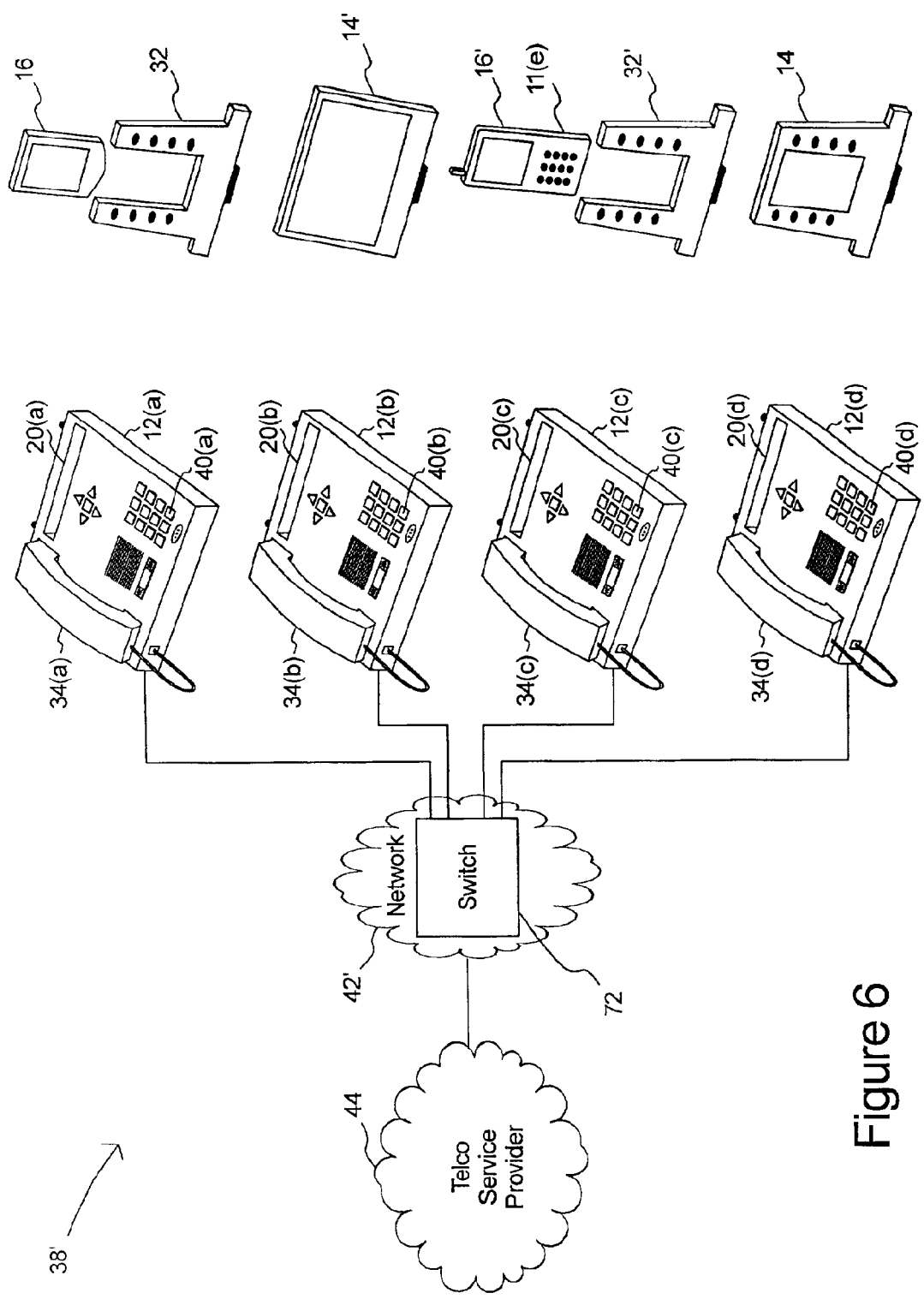
FIG. 6 is a block diagram of a circuit switched telephone embodiment of the network of FIG. 5.
Figure 7:
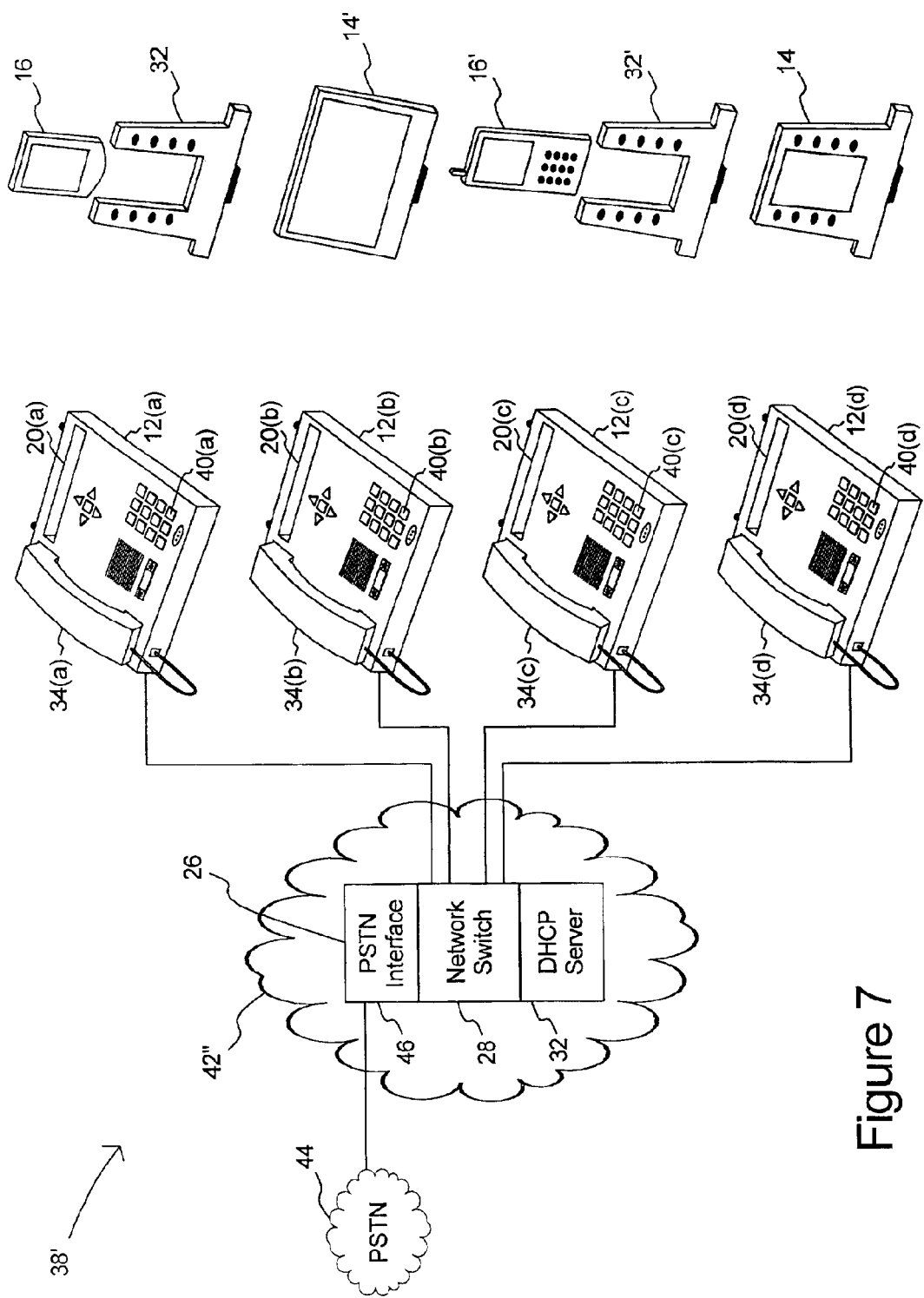
FIG. 7 is a block diagram of a packet switched telephone/data embodiment of the network of FIG. 5.

As such, FIG. 6 shows a circuit switched private telephone system 38'. The circuit switched private telephone system 38' may similar to the private telephone system 38 of FIG. 5 and includes a central telephone network switch 72 coupling to each base telephone unit 12(a)–12(d) via a circuit switched telephone network 42'. Similarly FIG. 7 shows a packet switched private telephone system 38" which may also similar to the private telephone system 38 of FIG. 5. The packet switched private telephone system 38" includes a telephone gateway 26 coupling to each base telephone unit 12(a)–12(d) via a TCP/IP compliant telephone/data network 42". The telephone gateway 26 may include the functionality of a network switch 29 (e.g. Ethernet switch) and a DHCP server 37 for providing basic operation of the TCP/IP compliant network 42" and may include a PSTN-TCP/IP router 46 for enabling the telephone units 12(a)–12(d) to set up and maintain audio sessions (e.g. place an receive telephone calls) over the PSTN 44.

It should be appreciated that the above described telephone system and telephone network system provide optimal configurability in that the most optimal display device based on size, resolution, gray scale, color depth, and other display parameters may be coupled to each telephone system within the telephone network.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A telephone comprising:
    a) a network interface circuit for audio session set-up and audio session communication with a remote telephone system over a network;
    b) an audio sub system for receiving a microphone input representing the voice of an operator and presenting audio data to the network interface circuit and for receiving audio data from the network interface circuit and generating a signal for driving a speaker;
    c) a docking interface configured for operatively coupling a device from a group of devices consisting of:
        i) a simple display device which comprises a display for representing information in accordance with a video signal received through the docking interface; and
        ii) a portable computing device which comprises a display and display circuits for generating an internal video signal for driving its display in accordance with data files received through the docking interface;
    d) a display controller coupled to the docking interface for coupling the video signal representing the information related to operation of the telephone to the simple display device;
    e) a communication controller coupled to the docking interface for coupling the data files containing information related to operation of the telephone to the portable computing device.

2. The telephone of claim 1, wherein the data files comprise:
    tagged data elements representing the information related to operation of the telephone; and
    a style sheet defining the aesthetic display of the tapped data elements on the display of the portable computing device.

3. The telephone of claim 1, further including a device detection circuit coupled to the docking interface for identifying whether the device coupled to the display docking bay is a portable computing device or a simple display device.

4. The telephone of claim 3, further comprising a telephone application program executed by a processor:
    a) writing an image to predefine memory space for scanning by the display controller which generates the video signal there from; and
    b) generating the data files for transfer to the portable computing device by the communication controller.

5. The telephone of claim 4, wherein the data files comprise:
    tagged data elements representing the information related to operation of the telephone; and
    a style sheet defining the aesthetic display of the tagged data elements on the display of the portable computing device.

6. The telephone of claim 5, further comprising a power supply circuit for coupling at least one of operating power and charging power to the docking bay whereby the modular display device may at least one of operate and charge using the power coupled to the docking bay when coupled to the docking bay.

7. A desk top telephone system comprising:
    a) a base telephone unit comprising:
        i) a network interface circuit for audio session set-up, and audio session communication with a remote telephone system; and
        iii) a display docking interface;
    b) a simple display device configured for coupling to the display docking interface for receiving a video signal from the base telephone unit and generating a representation on a display screen in accordance with the video signal; and
    c) a portable computing device configured for coupling to the display docking interface for receiving data files generating a video signal representing content of the data files for driving a representation of the content on a display;
    d) wherein the base telephone unit further includes a display control system comprising:
        a display controller coupled to the docking interface for coupling the video signal to the simple display device; and
        a communication controller coupled to the docking interface for coupling the data files to the portable computing device.

8. The desk top telephone system of claim 7, wherein the data files comprise:
    tagged data elements representing information related to operation of the base telephone unit; and
    a style sheet defining the aesthetic display of the tagged data elements on the display of the portable computing device.

9. The desk top telephone system of claim 7, wherein the base telephone unit further comprises a device detection circuit coupled to the display docking interface for identifying whether a device coupled to the display docking interface is a portable computing device or a simple display device.

10. The desk top telephone system of claim 9, wherein the telephone unit further comprises a telephone application program executed by a processor:
    a) writing an image to predefine memory space for scanning by the display controller which generates the video signal there from; and
    b) generating the data files for transfer to the portable computing device by the communication controller.

11. The desk top telephone system of claim 10, wherein the data files comprise:
    tagged data elements representing information related to operation of the base telephone unit; and
    a style sheet defining the aesthetic display of the tagged data elements on the display of the portable computing device.

12. The desk top telephone system of claim 11, wherein the base telephone unit further comprises a power supply circuit for coupling at least one of operating power and charging power to the display docking interface whereby the simple display device and the portable data device may at least one of operate and charge using the power coupled to the display docking bay when coupled to the display docking interface.

13. A desk top telephone system comprising:
    a) a base telephone unit comprising:

i) a network interface circuit for audio session set-up, and audio session communication with a remote telephone system;
iii) a display docking interface;
iv) a display control system for coupling both a video signal representing the content of a display screen and data files comprising information related to operation of the base telephone unit to the display docking interface; and b) a plurality of docking bay adapters, each configured to operatively couple one of a plurality of devices to the display docking interface;

c) the devices include at least one of:
a simple display device comprising a display for representing information in accordance with the video signal; and
a portable computing device which comprises a display and display circuits for generating an internal video signal for driving its display in accordance with the data files.

14. The desk top telephone system of claim 13, wherein the data files comprise:
tagged data elements representing the information related to operation of the base telephone unit; and
a style sheet defining the aesthetic display of the tagged data elements on the display of the portable computing device.

15. The desk top telephone system of claim 13, wherein the base telephone unit further comprises a device detection circuit coupled to the display docking interface for identifying whether a device coupled to the docking interface adapter is a portable computing device or a simple display device.

16. The desk top telephone system of claim 15, wherein the telephone unit further comprises a telephone application program executed by a processor:
a) writing an image to predefine memory space for scanning by the display controller which generates the video signal there from; and
b) generating the data files for transfer to the portable computing device by the communication controller.

17. The desk top telephone system of claim 16, wherein the data files comprise:
tagged data elements representing the information related to operation of the base telephone unit; and
a style sheet defining the aesthetic display of the tagged data elements on the display of the portable computing device.

18. A method of operating a telephone, the method comprising:
a) determining which of a simple display device and a portable computing device is coupled to a display docking interface;
a simple display device comprising a display for representing information in accordance with a video signal received through the docking interface; and
a portable computing device comprising a display and display circuits for generating an internal video signal or driving its display in accordance with data files received through the docking interface;

b) coupling a video signal to the display docking interface if the device is determined to be a simple display device; and c) coupling a data file comprising information related to operation of the telephone to the display docking interface if the device is determined to be a portable computing device.

19. The method of claim 18, wherein the data files comprise:
tagged data elements representing the information related to operation of the telephone; and
a style sheet defining the aesthetic display of the tagged data elements on the display of the portable computing device.

* * * * *